(12) United States Patent
Hölter

(10) Patent No.: US 6,375,721 B1
(45) Date of Patent: Apr. 23, 2002

(54) IONIZATION FILTER FOR PURIFYING AIR

(76) Inventor: Heinz Hölter, Beisenstrasse 39-41, Gladbeck (DE), D-45964

(*) Notice: Subject to any disclaimer, the term of this patent is extended or adjusted under 35 U.S.C. 154(b) by 0 days.

(21) Appl. No.: 09/424,969

(22) PCT Filed: Jun. 12, 1998

(86) PCT No.: PCT/DE98/01599

§ 371 Date: Dec. 3, 1999

§ 102(e) Date: Dec. 3, 1999

(87) PCT Pub. No.: WO98/56489

PCT Pub. Date: Dec. 17, 1998

(30) Foreign Application Priority Data

| Jun. 13, 1997 | (DE) | 197 25 030 |
| Jul. 14, 1997 | (DE) | 197 30 040 |
| Jul. 28, 1997 | (DE) | 197 32 335 |
| Aug. 14, 1997 | (DE) | 197 35 192 |
| Nov. 26, 1997 | (DE) | 197 52 393 |
| Dec. 20, 1997 | (DE) | 197 56 999 |
| Mar. 4, 1998 | (DE) | 198 09 068 |
| May 5, 1998 | (DE) | 198 19 939 |
| May 12, 1998 | (DE) | 198 21 184 |

(51) Int. Cl.⁷ .............................. B03C 3/155

(52) U.S. Cl. ............... 96/66; 55/486; 55/DIG. 38; 95/59; 96/68; 96/69; 96/97; 96/98; 422/186.04

(58) Field of Search ................ 96/69, 55, 59, 96/52, 53, 96–98, 66, 68; 55/485, 486, DIG. 38; 95/58, 59, 70–72; 422/186.04

(56) References Cited

U.S. PATENT DOCUMENTS

| 3,485,011 A | * | 12/1969 | Archer et al. | 96/96 X |
| 3,495,379 A | * | 2/1970 | Hall et al. | 96/96 X |
| 4,155,792 A | * | 5/1979 | Gelhaar et al. | 55/DIG. 38 |
| 4,354,861 A | * | 10/1982 | Kalt | 96/69 |
| 4,629,479 A | * | 12/1986 | Cantoni | 96/55 |
| 4,965,152 A |   | 9/1990 | Keough et al. | 55/DIG. 30 |
| 5,492,677 A | * | 2/1996 | Yoshikawa | 96/55 X |
| 5,741,352 A | * | 4/1998 | Ford et al. | 96/69 X |
| 5,792,241 A | * | 8/1998 | Browitt | 96/52 |

FOREIGN PATENT DOCUMENTS

| DE | 2854742 | * | 7/1980 | 96/55 |
| DE | 3703137 |   | 8/1988 | |
| DE | 4028531 |   | 3/1992 | |
| EP | 0403230 |   | 12/1990 | |
| JP | 55-24523 | * | 2/1980 | 96/55 |
| JP | 6-410 | * | 1/1994 | 96/55 |

* cited by examiner

*Primary Examiner*—Richard L. Chiesa
(74) *Attorney, Agent, or Firm*—James Creighton Wray; Meera P. Narasimhan

(57) ABSTRACT

The invention relates to an ionization filter for purifying air that is enriched with dust particles and other inorganic and organic pollutants. The filter has at least one electrically charged emission electrode for producing electrically conductive particles, and at least one passive electrode for collecting the pollutant particles that are in movement in the electric field between the emission electrode and the passive electrode. In accordance with the invention, an extra layer having denaturing properties is placed in the flow path of the pollutant particles that are to be precipitated. This layer is preferably composed of strongly acidic and strongly alkaline layers, or vice versa, with a neutral intermediate layer between layers of different pH values in each case. Microorganisms, such as bacteria, fungi, spores and/or allergens which move in the electric field of the ionization filter are simultaneously destroyed by this denaturing property.

22 Claims, No Drawings

IONIZATION FILTER FOR PURIFYING AIR

This application is the national stage of International Application No. PCT/DE98/01599, filed Jun. 12, 1998.

BACKGROUND OF THE INVENTION

The invention concerns an ionization filter for purifying air that is enriched with dust particles and other organic and inorganic pollutants, with at least one electrically charged emission electrode that is used to produce electrically conductive parts, and at least one passive electrode that is used to collect the pollutant particles which circulate between the emission electrode and the passive electrode.

In situations of high dust precipitation, such ionization filters, which so far are being utilized especially for the precipitation of dust from the smoke gas of fossil-fired plants, distinguish themselves by their low flow resistance towards smoke gas, which passes the electrodes and is purified. Beyond that, such electrostatic filters undergo very little wear and tear, and therefore need repairs only to a limited extent due their simple design, excluding movable parts.

Within buildings, such as residences, hospitals, public administration buildings, etc., an air purification process occurs, for example, within the circulation system of the air conditioning equipment, usually by means of regular filters that are commonly made of fleece-like materials. These filters present an extensive drop in pressure, and the purification effect decreases the greater the load becomes. Bacteria, fungi, spores or other microorganisms can pass through the filter, or can be released through leaks in the line system due to the increased fan pressure caused by the load, which can lead to considerable health problems for people who should be supplied with fresh air.

SUMMARY OF THE INVENTION

The invention is based on the task of developing a filter system, in particular one suitable for buildings, which effects a high purification efficiency, even towards harmful microorganisms, at a low drop in pressure.

According to the invention, this task is achieved by means of equipping an ionization filter of the kind described above with an additional layer of denaturing properties, and arranging it in the flow path of any pollutants that are generated.

In connection to the invention, the denaturing layer may be comprised of a material that has a free mass transfer area for microorganisms, its area being prepared in such a way that microorganisms die shortly after contact. Materials of denaturing effects can include appropriate copper compounds or other known toxic materials, with which the respective layer has been saturated, or otherwise prepared.

The invention thus ensures that not only customary dust particles and other microorganisms are precipitated on the passive electrode of the ionization filter, but also that additional microorganisms are simultaneously killed by the denaturing layer that is employed hereupon.

Another feature of the invention that proves particularly beneficial is the use of a material for the denaturing layer that is either strongly acidic or strongly alkaline or appropriately pre-treated. A strongly acidic material would mean a pH value between 1 and 3, and strongly alkaline would mean a pH value between 11 and 14.

It has been shown that nearly all microorganisms die in such an extreme environment.

It proves especially effective to arrange the denaturing layer in several sub-layers, with alternating strongly acidic and strongly alkaline layers, or vice versa, and with a neutral intermediate layer between two layers of different pH values. This additional and extreme change in environmental conditions creates a particularly high microorganism-extermination rate. The shift from strongly acidic to strongly alkaline environmental conditions, and vice versa, can be obtained by preparation with appropriate salts or lye.

It is best to arrange the denaturing layer directly in front of the surface of the passive electrode, or to design the surface of the passive electrode additionally as a denaturing area.

If the denaturing material is electrically conductive or becomes electrically conductive by integrating appropriate materials, such as wire mesh or wire screens, then the denaturing layer itself can even be utilized directly as a passive electrode.

On ionization filters that use a metal wire as the emission electrode, it proves useful to additionally equip the wire-shaped emission electrode with extra-fine wire tips across its entire length in order to increase efficiency. At the end of such extra-fine wire tips, which are best arranged around the emission electrode at an angle between 60° and 90°, very strong electric fields are known to develop, which cause an appropriately intense ionization of the particles that pass this area. This in turn leads to a high precipitation rate on the oppositely charged passive electrode.

In smaller air-conditioning systems, such as in residential buildings or especially in automobiles, the emission electrode of the ionization filter is a metal wire arranged in the middle of an electrically conductive tube pipe, while the denaturing layer is located on the interior surface of the flow channel that surrounds the emission electrode. Such filters can easily be flanged into existing flow paths and be taken out and replaced with other units when they have become loaded.

When the ionization filter is operating, it has proven useful to adjust the electric tension between the emission electrode and the passive electrode to a value above 5,000 V (preferably above 7,000 V). Such high tension generally forms ozone, which additionally contributes to killing microorganisms.

The loaded ionization filters in accordance with the invention can be disposed of particularly easily and thermally if—according to another feature of the invention—the passive electrode consists of a thermally recoverable organic base material, which is reinforced with an electrically conductive organic material. The organic base material, which should not be sensitive towards acid and/or alkali, can include stiffened paper, cardboard, plastic fleece or similar materials. For the electrically conductive material in place for reinforcement purposes, graphite should be used.

If the denaturing layer consists of alternate sub-layers of different pH values and is simultaneously being used as the passive electrode, then another feature of the invention calls for all denaturing layers to be reinforced with graphite and made appropriately electrically conductive.

Especially in the case of ionization filters which are used for the purification of larger air volumes, further optimization can be effected by equipping the passive electrode with a mesh design on every side that faces an emission electrode, each mesh area preferably being covered with acidic, neutral and alkaline layers that are arranged behind each other and with an acidic or alkaline layer alternately forming the surface that faces the emission electrode. This type of bevel-like design for the denaturing layer is similar to a chessboard, and ensures that microorganisms are exposed to constantly changing environmental conditions which kill them quickly, both when passing the layer that is parallel to the surface and when flowing through the layer that is vertical to the surface.

The planned mesh design as such can be shaped randomly, but should preferably be of rectangular, square or also hexagonal shape in honeycomb form.

For further optimization of the ionization filter's precipitation effect it has also proven useful to arrange several passive electrodes of denaturing effect in rows. This way, any particles that still manage to pass the main passive electrode are precipitated in one of these subsequent additional passive electrodes. This precipitation effect can even be increased if, in accordance with another feature of the invention, an ion surplus with regard to the absorption capability of the main passive electrode is generated on the emission electrode.

Since air that is to be purified generally does not have consistent humidity, it has proven useful, according to another feature of the invention, to impregnate the denaturing layers additionally with hygroscopic substances, such as potassium salts and/or sodium salts. Hygroscopic substances absorb moisture from the air and thus ensure that the humidity level which is required to maintain the strongly acidic and/or strongly alkaline properties is always guaranteed within the denaturing layer.

According to another feature of the invention, the denaturing layer can be additionally impregnated or soaked with polyclonal and/or monoclonal antibodies. Such antibodies cause especially allergens to be precipitated and denatured in a higher degree than would be the case in a system that is only acidic and/or alkaline. The antibodies can be fed either by impregnating the sub-layers of the denaturing layer or by incorporating an additional layer that has been saturated with antibodies. It is also possible, if necessary, to additionally saturate the denaturing layers with agents that actively work against the formation of endotoxins—poisonous substances that are known to develop during the disintegration of bacteria—or to provide for other saturation means against fungal growth.

For the purpose of increasing the degree of precipitation on the ionization filter, it may prove useful according to another feature of the invention to direct an atomized aerosol into the air that is to be purified before it passes the emission electrode. The fine aerosol drops are also ionized in the area of the emission electrode and moved towards the passive electrode. Due to the subsequently increased ion density within the ionization filter, an increased area has been generated for minute particles to attach to, which means that such particles can then be transported to the passive electrode in higher quantities. It has proven effective to generate the aerosol in an ultra-sound atomizer, which distinguishes itself through its particularly fine atomization effect.

If necessary, activated carbon can be integrated additionally into the denaturing layer directly or in the form of an additional layer in order to precipitate additional pollutants or also to increase precipitation effectiveness.

What is claimed is:

1. Ionization filter for the purification of air that is enriched with dust particles and other inorganic and organic pollutants, with at least one electrically charged emission electrode for the generation of electrically conductive particles and at least one passive electrode for the collection of pollutants that are circulated in the electrical field between the emission electrode and the passive electrode, comprising a layer having denaturing properties, which is arranged in a flow path of the pollutant particles that are to be precipitated, wherein the denaturing layer is connected with a surface of the passive electrode and wherein the denaturing layer is strongly acidic or strongly alkaline.

2. Ionization filter according to claim 1, characterized by the fact that the denaturing layer consists of several sub-layers, with alternating strongly acidic or strongly alkaline layers, or vice versa, and with a neutral intermediate layer arranged between two layers of different pH values.

3. Ionization filter according to claim 1, characterized by the fact that the surface of the passive electrode or the entire passive electrode has denaturing properties.

4. Ionization filter according to claim 1, characterized by the fact that the emission electrode is a metal wire, which is equipped with extra-fine wire tips that are distributed along its entire length.

5. Ionization filter according to claim 4, characterized by the fact that the extra-fine wire tips are fastened to the wire within an angle range of 60° to 90° to the wire axis.

6. Ionization filter according to claim 1, characterized by the fact that the passive electrode has the shape of a tube and that the denaturing layer is arranged on the interior surface facing the emission electrode.

7. Ionization filter according to claim 6, characterized by the fact that the tube-shaped passive electrode can be flanged into the flow path and integrated with it.

8. Ionization filter according to claim 1, characterized by the fact that the electric tension between the emission electrode and the passive electrode is higher than 7,000 V.

9. Ionization filter according to claim 1, characterized by the fact that the passive electrode consists of an organic base material that is thermally recoverable and reinforced with an electrically conductive organic material.

10. Ionization filter according to claim 9, characterized by the fact that the electrically conductive material is graphite.

11. Ionization filter according to claim 9, characterized by the fact that the passive electrode has at least three layers, with a chemically neutral layer between a strongly acidic and a strongly alkaline layer, and that each layer is reinforced with graphite.

12. Ionization filter according to claim 1, characterized by the fact that the passive electrode is equipped with a mesh design on every side that faces an emission electrode, with each mesh area being covered with acidic, neutral and alkaline layers that are arranged one after the other, and with an acidic or alkaline layer alternately forming the surface that faces the emission electrode.

13. Ionization filter according to claim 12, wherein the layers comprise felt layers.

14. Ionization filter according to claim 12, characterized by the fact that the mesh design has a rectangular, square and/or hexagonal shape.

15. Ionization filter according to claim 14, wherein the mesh design has a honeycomb shape.

16. Ionization filter according to claim 1, characterized by the fact that at least two passive electrodes of denaturing properties are connected in series in the flow path of the electrically charged pollutants.

17. Passive electrode according to claim 16, characterized by the fact that an ion surplus is generated in the emission electrode.

18. Ionization filter according to claim 1, characterized by the fact that the denaturing layers are additionally soaked or saturated with substances of hygroscopic effect.

19. Ionization filter according to claim 1, characterized by the fact that the denaturing layers are additionally soaked with monoclonal antibodies, and/or with substances against endotoxins and/or substances against fungi.

20. Ionization filter according to claim 1, characterized by the fact that the air current which is to be purified is fed an atomized aerosol before passing the emission electrode.

21. Ionization filter according to claim 20, characterized by the fact that the aerosol is generated in an ultra-sound atomizer.

22. Ionization filter according to claim 1, characterized by the fact that activated carbon is integrated either directly into the denaturing layer or in the form of an additional layer.

* * * * *